June 20, 1944.  R. G. ALLEN  2,351,899
MOLD OPERATING MECHANISM
Filed Jan. 7, 1942  4 Sheets-Sheet 1

R. G. Allen
INVENTOR

BY Rule My Hoge.
ATTORNEYS

June 20, 1944.  R. G. ALLEN  2,351,899
MOLD OPERATING MECHANISM
Filed Jan. 7, 1942   4 Sheets-Sheet 2
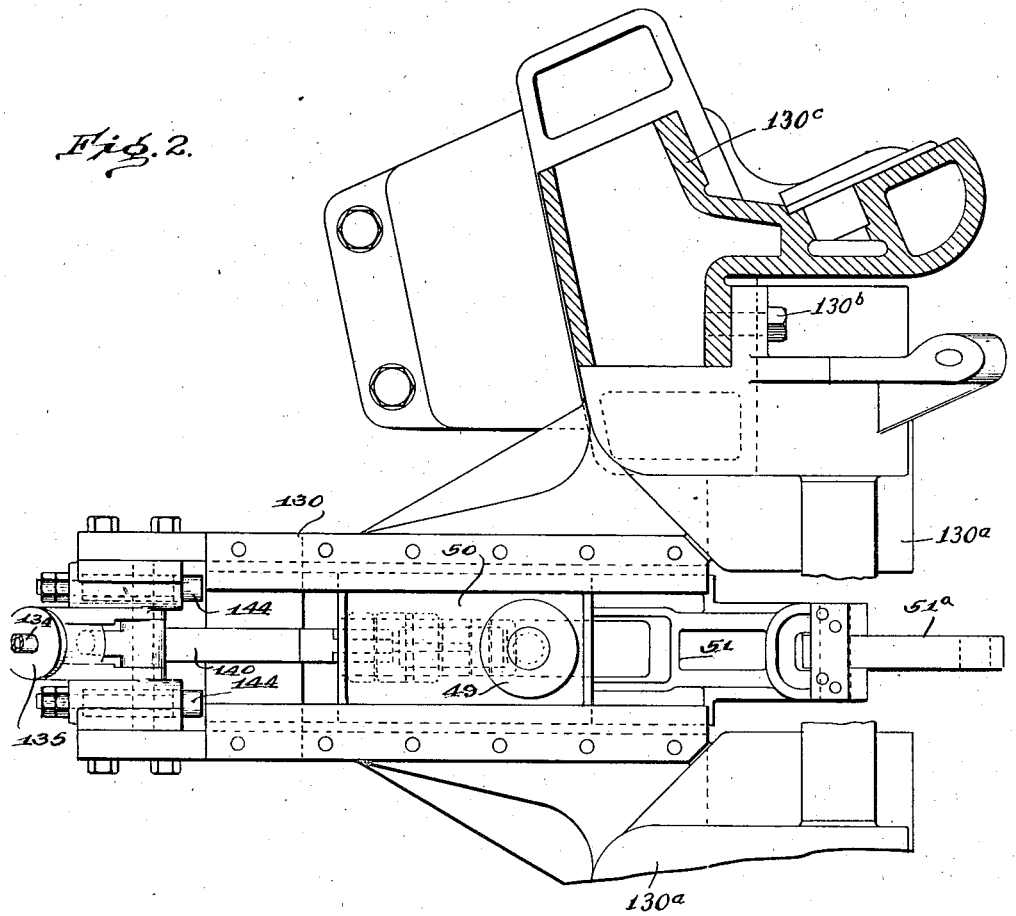
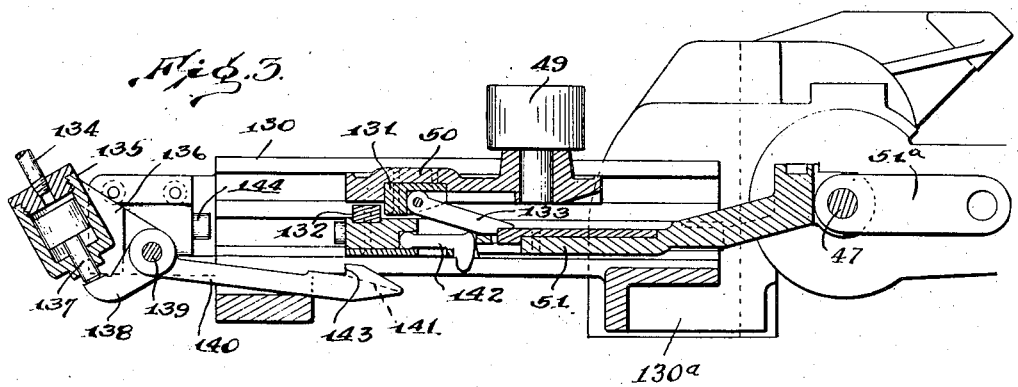
R. G. Allen
INVENTOR
BY Rule and Hoge
ATTORNEYS June 20, 1944.  R. G. ALLEN  2,351,899
MOLD OPERATING MECHANISM
Filed Jan. 7, 1942  4 Sheets-Sheet 3
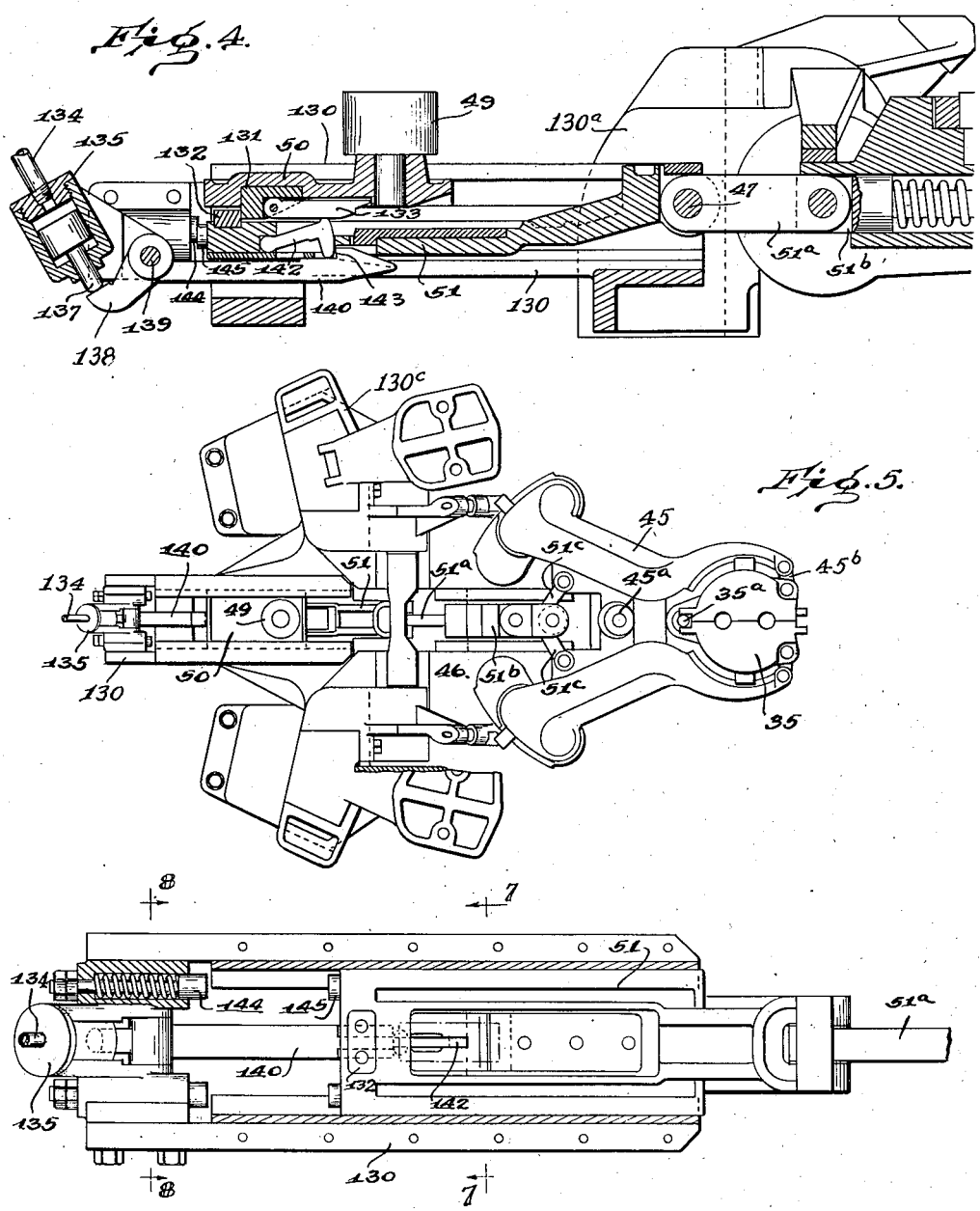

June 20, 1944.   R. G. ALLEN   2,351,899
MOLD OPERATING MECHANISM
Filed Jan. 7, 1942   4 Sheets-Sheet 4
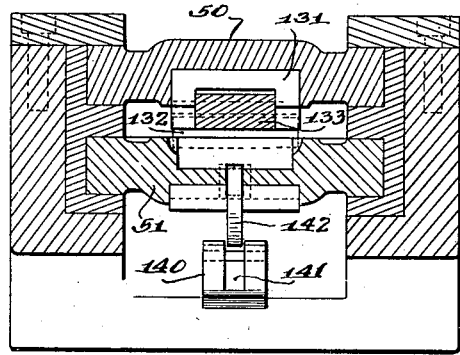
Fig. 7.
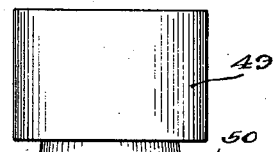
Fig. 8.
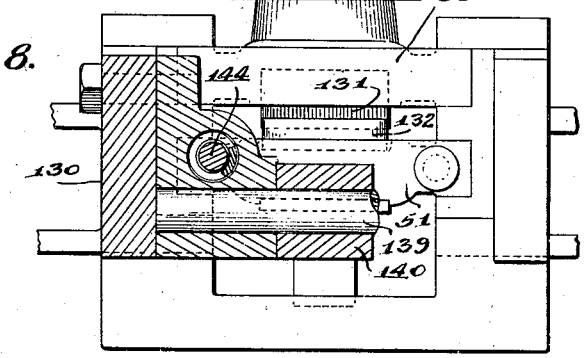
Fig. 9.
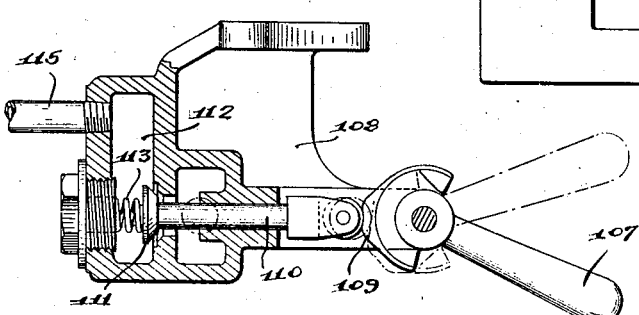
Fig. 10.
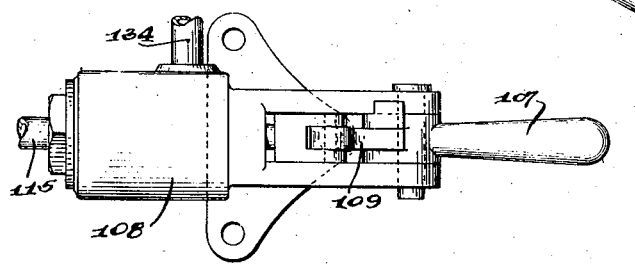
R. G. Allen
INVENTOR
BY Rule & Hoge
ATTORNEYS Patented June 20, 1944

2,351,899

UNITED STATES PATENT OFFICE 2,351,899

MOLD OPERATING MECHANISM

Russell G. Allen, Alton, Ill., assignor to Owens-Illinois Glass Company, a corporation of Ohio Application January 7, 1942, Serial No. 425,839

9 Claims. (Cl. 49—42)

My invention relates to machines for blowing glassware, such as bottles, jars and other hollow articles, and comprises means to facilitate changing of the molds while the machine is in operation. The invention as herein illustrated is embodied in an automatic glass blowing machine of the Owens suction gathering type, comprising a mold carriage which rotates continuously about a vertical axis and a series of heads or units rotating with the carriage. Each unit includes a mold group comprising a partible neck mold, a partible blank mold adapted to register with the neck mold, and a partible finishing mold. The blank mold is positioned beneath the neck mold and when closed registers with the closed neck mold to form a parison mold which is periodically lowered into contact with a pool of molten glass from which charges of glass are drawn into the mold. After the parison has been formed, the blank mold is opened, leaving the parison suspended from the neck mold. The finishing mold is then swung upward and closed around the parison and the latter blown to finished form therein. Thereafter the neck mold is opened and the finishing mold with the blown article therein is swung downward in order to clear the pot from which the glass has been drawn. After passing the pot the finishing mold is swung upward to an intermediate position and opened to discharge the blown article.

In machines of this type it is frequently necessary to change certain molds or an entire set of molds and it is highly desirable to provide means permitting the molds to be changed while the machine is running. Where it becomes necessary to stop the machine for changing molds, production is interfered with owing to the time which is lost while the machine is not running and the further time required for reestablishing temperature and operating conditions when the machine is again started. The present invention relates particularly to means to facilitate changing of the finishing molds while the machine is running.

In machines of the type indicated the finishing molds normally remain closed the greater part of the time and when open are inaccessible for mold changing. An object of the present invention is to provide manually controlled means for holding the finishing molds open and in accessible position a sufficient length of time to permit changing them without stopping the machine or slowing down the mold carriage.

A further object of the invention is to provide control devices individual to the finishing molds whereby the finishing mold of any selected mold group may be thrown out of operation and held open in a manner to permit mold changing without interfering with the continued normal operation of the other mold groups.

Other objects of the invention will appear hereinafter.

The present application discloses subject matter disclosed and claimed in my copending applications, Serial Numbers 425,838 and 425,840, filed January 7, 1942.

Referring to the accompanying drawings which illustrate the invention as applied to a machine of the Owens type for blowing bottles and other hollow ware:

Fig. 2 is a part-sectional plan view showing cam operated slides for opening and closing a finishing mold.

Fig. 3 is a longitudinal sectional elevation of the same.

Fig. 4 is a view similar to Fig. 3 but showing parts set for mold changing.

Fig. 5 is a plan view of a finishing mold and its operating mechanism.

Fig. 6 is a part-sectional plan view of mechanism shown in Fig. 2.

Figure 1:
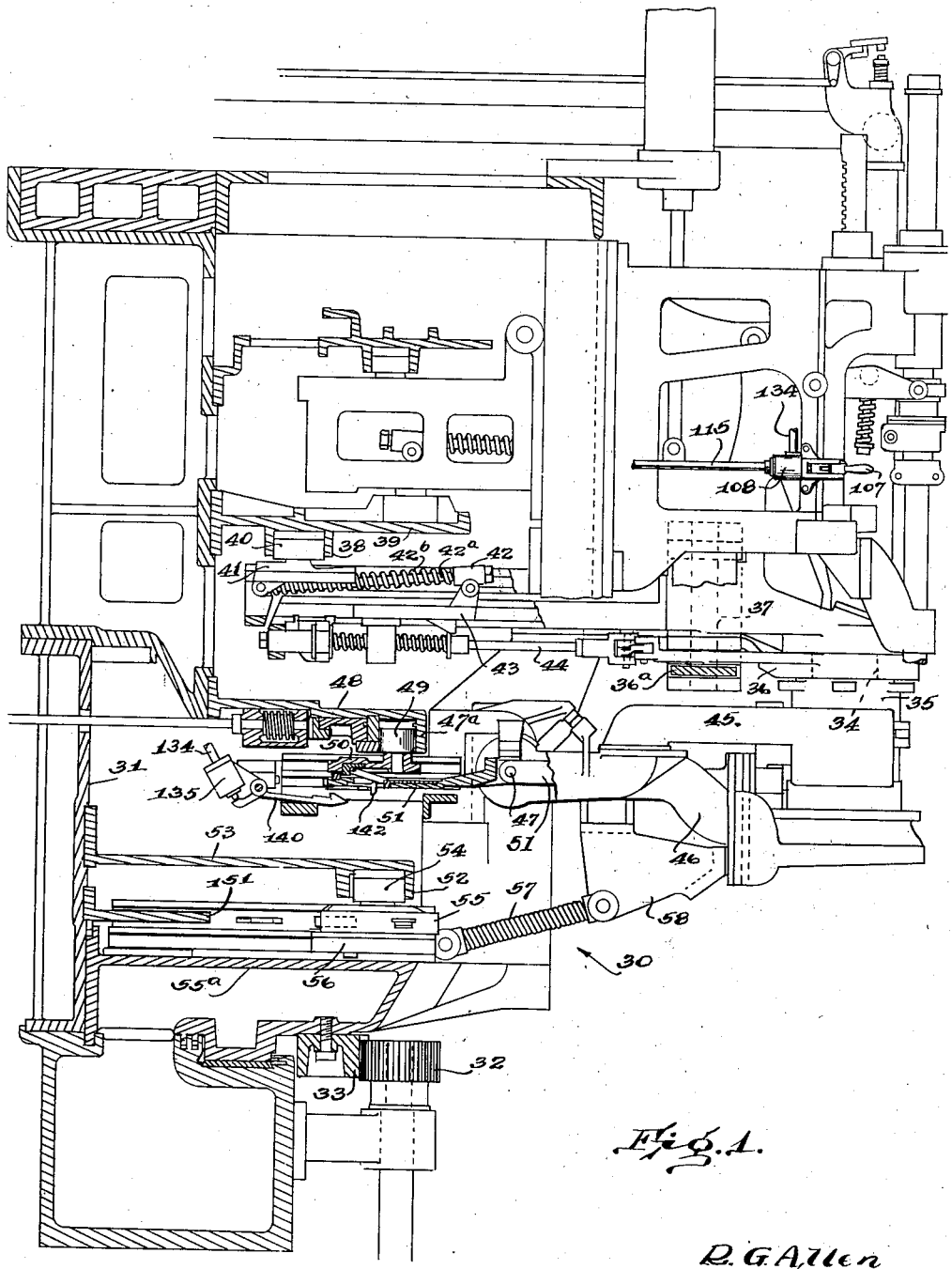
Fig. 1 is a sectional elevation of the machine, parts being broken away, showing one head or unit.

Figs. 7 and 8 are cross-sections at the lines 7—7 and 8—8 respectively on Fig. 6.

Fig. 9 is a sectional elevation and Fig. 10 a plan view of a manual control valve and its operating lever.

Referring particularly to Fig. 1, the machine comprises a mold carriage 30 mounted for continuous rotation about the vertical axis of a stationary center column 31. The carriage may be rotated by an electric motor having driving connections with the carriage through a train of gearing including a driving pinion 32 which runs in mesh with a ring gear 33 on the carriage. A plurality of heads or units which may be arranged in an annular series on the mold carriage, each comprises a mold group including a parison mold 34 (comprising a blank mold and a neck mold) and a finishing mold 35. The molds and their operating mechanisms may be in the main of conventional construction and operation, except as such mechanisms are modified to cooperate with means for controlling the mold movements to facilitate mold changing operations. For a full disclosure of an Owens type of machine, reference may be had to the patent to La France, 1,185,687, June 6, 1916, and the Allen patent, Number 2,269,391, January 6, 1942.

The neck mold sections are carried on arms 36 mounted to swing about a pivot pin 37 for opening and closing the neck mold. The blank mold sections are in like manner carried on arms 36ª mounted to swing on the pin 37. These movements of the blank mold and neck mold are controlled by a stationary cam track 38 formed on a cam plate 39. A cam follower roll 40, running on the cam track 38, is carried by an upper slide 41 having a yielding connection with a lower slide 43. Said connection includes a rod 42ª slidable in a connector 42, and compression spring 42ᵇ coiled on the rod. The slide 43 has operating connection through a rod 44 with the blank mold carrying arms which operate in a conventional manner to swing the neck mold arms and open the neck mold during the final opening movement of the blank mold.

The finishing mold sections 35 are mounted for swinging movement on a frame 46, herein referred to as the finishing mold carrier. The mold sections are swung about a pivot 35ª (Fig. 5) to open and close the mold, by means of arms 45 pivoted at 45ª and connected through links 45ᵇ to the mold sections. The inner ends of the arms 45 are slidably supported on the frame 46, in accordance with conventional construction. Such a construction is shown, for example, in the U. S. patent to Benoit et al. No. 2,225,898, to which reference may be had for a full disclosure of such construction, its purpose, and mode of operation. The frame 46 is mounted to swing up and down about a horizontal axis 47 (Fig. 1) for lifting the finishing mold into register with the neck mold and for lowering the finishing mold.

The opening and closing movements of the finishing mold are under the control of a stationary cam track 47ª formed on a cam plate 48. A cam roll 49 running on the cam track is carried on an upper slide 50 operatively connected, as fully described hereinafter, to a lower slide 51. The slide 51 has operating connections with the mold swinging arms 45 through a link 51ª, slide block 51ᵇ, and link 51ᶜ.

The up and down swing movements of the finishing mold carrier 46 are controlled by a cam track 52 (Fig. 1) on a stationary cam plate 53. A cam follower roll 54 running on the cam 52 is carried by an upper slide 55 operatively connected to a lower slide 56. The latter has a link connection 57 with a bracket 58 fixed to and forming a part of the mold carrier 46. The slides 55 and 56 are mounted to reciprocate in a slide frame 55ª.

If desired, mechanism may be provided, such that when the control means (Fig. 9) is set for a mold changing operation, as hereinafter described, the finishing mold carrier during its upward swing, after the mold has discharged the blown article, is released from the control of the cam track 52 and brought under the control of an auxiliary cam track 151, which maintains the finishing mold at an intermediate angle, convenient for changing the finishing molds, all as set forth in my copending application, Serial No. 425,838, hereinbefore referred to. The mold carrier may be retained at this angle until it nears the gathering pot when it is again placed under the control of the main cam 52 so that the mold carrier is swung down to clear the pot. As this mechanism controlled by the cam track 151 is not a part of the present invention, further disclosure of the same herein is deemed unnecessary. When the apparatus is set for mold changing operation, the opening and closing movements of the finishing mold are taken out of the control of the cam 47ª, so that the finishing mold is held open.

The mechanism for controlling the opening and closing movements of the finishing mold is embodied in a fluid (preferably air) control system which is manually set for operation by a hand lever 107 (Figs. 9 and 10) herein referred to as the air valve lever, which controls the supply of an operating fluid, as air, to said system. The hand lever is pivotally mounted on a bracket 108 supported at any convenient position on the mold carriage. The bracket is formed with a valve chamber 112 in which is a manual control valve 111. The stem 110 of the valve carries a roll in the path of a cam 109 on the hand lever. The valve is normally held closed by a spring 113 and the hand lever 107 in its upper position. When the lever is thrown down, it opens the valve. Air or other fluid under pressure is supplied through a pressure line 115 so that when the valve is opened the air pressure is transmitted through a pipe 134 to a piston motor 135.

The upper and lower slides 50 and 51 are mounted to reciprocate in slideways in frame 130 supported on or cast integral with frame members 130ª (Fig. 2), secured by bolts 130ᵇ to castings 130ᶜ which form a part of the main framework or supporting structure of the mold carriage. Blocks 131 and 132 (Figs. 3 and 4) secured respectively to the upper and lower slides, provide a driving connection between the slides by which the inward movement of the upper slide in transmitted to the lower slide for opening the finishing mold. During the normal operation of the machine the outward movement of the upper slide is transmitted to the lower slide through a latch 133 which is pivoted at one end in the block 131, the free end of the latch being arranged to engage the slide 51.

When the manual control valve 111 (Fig. 9) is opened to set the mechanism for mold changing, the motor 135 is operated and a plunger 137 on the motor piston is thereby caused to engage a rock arm 138 pivoted on a road 139. A latch arm 140, which may be integral with the arm 138, is formed with a cam surface 141 adapted to engage a finger 142 pivoted in the slide 51. The motor 135 operates to swing the arm 140 upward so that when the lower slide 51 moves inwardly or to the left from the Fig. 3 position, the finger 142 is cammed upwardly and lifts the latch 133 (Fig. 4). This releases the upper slide so that it may move outwardly independently of the lower slide. The outer end of the lever 140 is formed with hooks or shoulders 143 to engage the slide 51 at opposite sides of the finger 142, thereby holding the slide in its inner position with the mold sections held apart. The mold is thus held open as long as the air pressure is maintained in the motor 135.

Spring buffers 144 are mounted in the frame 130 in position to be engaged by contact pieces 145 on the inner end of the slide 51 as the latter nears its innermost position. When the latch lever 140 has been moved upward to its operative position, and the upper slide 50 moves outwardly, the buffers 144 serve to apply a yielding pressure of the slide 51 against the hooks 143. This prevents the latch 140 from dropping and releasing the slide 51 when pressure is cut off from the motor 135, until the upper slide has been moved inwardly again to engage the lower slide and thus release the latch lever which then drops by gravity. Thus premature outward movement of the lower slide and closing of the finishing mold are prevented.

Modifications may be resorted to within the spirit and scope of my invention.

I claim:

1. A molding machine comprising in combination a mold carriage, means for driving the carriage, a mold on the carriage comprising partible sections, a stationary cam, means providing operating connections between the cam and the mold sections for opening and closing the mold during the travel of the mold carriage, said operating connections including slides, a latch providing a driving connection between the slides, a manual control device, and a latch releasing device actuated by said control device for engaging the latch and moving it to an inoperative position and thereby breaking said connection between the slides.

2. A molding machine comprising a combination a mold carriage, means for driving the carriage, a mold on the carriage comprising partible sections, a stationary cam, means providing operating connections between the cam and the mold sections for opening and closing the mold during the travel of the mold carriage, said operating connections including slides, a latch providing a driving connection between the slides, a manual control device, and a latch releasing device actuated by said control device for engaging the latch and moving it to an inoperative position and thereby breaking said connection between the slides, said control device including a latch operable to engage and hold one of said slides while the other said slide is free for movement under the control of the stationary cam.

3. A molding machine comprising in combination a mold carriage, means for driving the carriage, a mold on the carriage comprising partible sections, a stationary cam, means providing operating connections between the cam and the mold sections for opening and closing the mold during the travel of the mold carriage, said connections comprising slides, a latch providing a driving connection between the slides, and a cam follower roll on one said slide running on the cam, the other said slide being operatively connected to the mold sections, a manual control device, and a latch releasing device actuated thereby and arranged to move the latch to inoperative position and thereby disconnect said slides.

4. A molding machine comprising in combination a mold carriage, means for driving the carriage, a mold on the carriage comprising partible sections, a stationary cam, means providing operating connections between the cam and the mold sections for opening and closing the mold during the travel of the mold carriage, said connections comprising slides, a latch providing a driving connection between the slides, and a cam follower roll on one said slide running on the cam, the other said slide being operatively connected to the mold sections, a motor, manual means for effecting the operation of said motor, and a latch releasing device actuated by the motor and arranged to move the latch to inoperative position and thereby disconnect said slides.

5. A molding machine comprising in combination a mold carriage, means for driving the carriage, a mold on the carriage comprising partible sections, a stationary cam, means providing operating connections between the cam and the mold sections for opening and closing the mold during the travel of the mold carriage, said operating connections between the cam and mold sections including slides, a cam follower roll on one of said slides running on said cam, a latch forming a driving connection between said slides, a manual control device, means actuated thereby to release said latch, and means actuated by said control device to hold the mold sections in open position while the said latch remains released.

6. A molding machine comprising in combination a mold carriage mounted for rotation about an axis, means for rotating the carriage, a mold on the carriage comprising partible mold sections, a stationary cam, means providing operating connections between the cam and the mold sections for opening and closing the mold during the rotation of the mold carriage, said connecting means including slides mounted for movement radially of the mold carriage, a cam follower roll on one said slide and running on said cam, the other slide being operatively connected to the mold sections, a latch forming a driving connection between the slides and causing one slide to drive the other slide in a direction to close the mold sections, means separate from said latch providing a driving connection between said slides for moving them in a direction to open the mold, and a manually controlled device for releasing said latch.

7. A molding machine comprising in combination a mold carriage mounted for rotation about an axis, means for rotating the carriage, a mold on the carriage comprising partible mold sections, a stationary cam, means providing operating connections between the cam and the mold sections for opening and closing the mold during the rotation of the mold carriage, said connecting means including slides mounted for movement radially of the mold carriage, a cam follower roll on one said slide and running on said cam, the other slide being operatively connected to the mold sections, a latch forming a driving connection between the slides and causing one slide to drive the other slide in a direction to close the mold sections, a fluid operated motor, a manual control device for controlling the operation of said motor, means actuated by said motor for releasing said latch, and holding means connected with said latch releasing means for holding the mold open while said latch remains in released position.

8. A molding machine comprising in combination a mold carriage mounted for rotation about an axis, means for rotating the carriage, a mold on the carriage comprising partible mold sections, a stationary cam, means providing operating connections between the cam and the mold sections for opening and closing the mold including a cam roll slide and a second slide, both mounted for movement radially of the mold carriage in parallel paths, a cam roll carried by the cam roll slide and running on the cam, a latch pivoted to one said slide and engaging the other slide, said latch forming a driving connection between said slides when the cam roll slide is moved radially in one direction, means separate from said latch forming a driving connection between said slides when the cam roll slide is moved in the other direction, an arm pivotally mounted on the carriage, manually controlled means for swinging said arm, and means actuated by the arm when swung in one direction to release said latch, said arm including holding means for holding the said second slide while the latch is released.

9. A molding machine comprising in combination a mold carriage mounted for rotation about an axis, means for rotating the carriage, a mold on the carriage comprising partible mold sections, a stationary cam, means providing operating connections between the cam and the mold sections for opening and closing the mold including a cam roll slide and a second slide, both mounted for movement radially of the mold carriage in parallel paths, a cam roll carried by the cam roll slide and running on the cam, a latch pivoted to one said slide and engaging the other slide, said latch forming a driving connection between said slides when the cam roll slide is moved radially in one direction, means separate from said latch forming a driving connection between said slides when the cam roll slide is moved in the other direction, an arm pivoted on the mold carriage for up and down swinging movement, a fluid operated motor, means providing connections between the motor and said arm for swinging it upward when fluid pressure is applied to the motor, means actuated by the arm for releasing said latch when the arm is swung upward, said arm being formed with a holding surface to engage said second slide when the latch is released, means for holding said second slide with a yielding pressure against said holding surface while the latch is in released position and thereby applying a holding pressure to the arm by which it is prevented from dropping and releasing the slide, and means actuated by said cam roll slide to remove said pressure and permit said arm to drop.

RUSSELL G. ALLEN.